(No Model.)
C. FREESE.
FENDER FOR VEHICLES.
No. 478,585. Patented July 12, 1892.
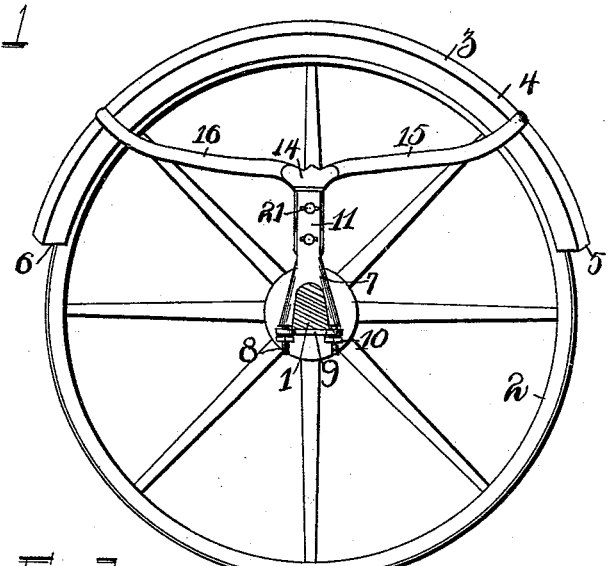
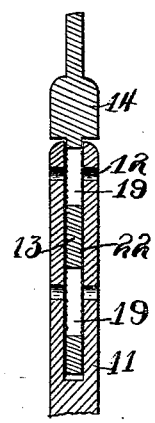
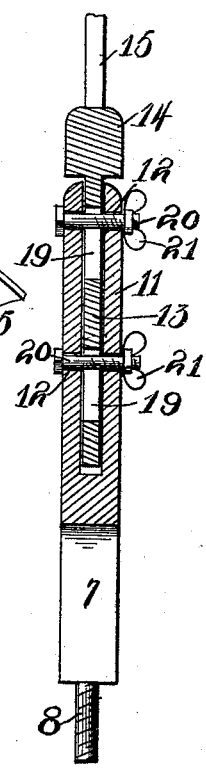
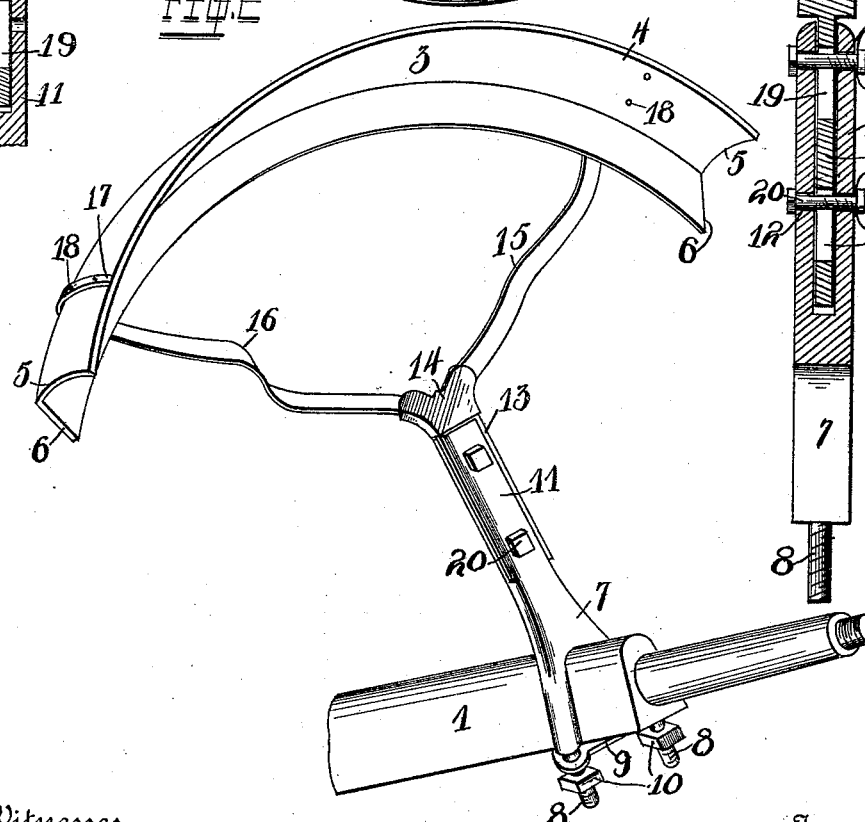
Witnesses
A. A. Eicke
Ed. E. Longan
Inventor
Claus Freese
By his Attorneys Higdon & Higdon

UNITED STATES PATENT OFFICE.

CLAUS FREESE, OF ST. LOUIS, MISSOURI, ASSIGNOR OF ONE-HALF TO HENRY GIESSENBIER, OF SAME PLACE.

FENDER FOR VEHICLES.

SPECIFICATION forming part of Letters Patent No. 478,585, dated July 12, 1892.

Application filed February 1, 1892. Serial No. 419,931. (No model.)

*To all whom it may concern:*

Be it known that I, CLAUS FREESE, of the city of St. Louis and State of Missouri, have invented certain new and useful Improvements in Fenders for Vehicles, of which the following is a full, clear, and exact description, reference being had to the accompanying drawings, forming a part hereof.

My invention relates to improvements in fenders for vehicles; and it consists in the novel arrangement and combination of parts, as will be more fully hereinafter described, and designated in the claims.

In the drawings, Figure 1 is a rear elevation of my complete invention as applied to the axle of the vehicle. Fig. 2 is a perspective view of the same having the wheel detached from the axle. Fig. 3 is a vertical longitudinal section through the adjusting mechanism of my invention, and Fig. 4 is a similar section showing a modification of my invention.

The object of my invention is to so construct the fender that it can be easily and quickly attached directly to the axle of the vehicle, and, further, in so constructing the same that it will fit wheels of various sizes.

The fenders heretofore employed could not be effectually applied to the front wheels of the vehicle for the reason that the axle upon which the said wheels are mounted when turned would cause the said wheels to move from under the fender, and consequently there would be no provision for preventing the dirt or mud from flying into the body of the vehicle.

Referring to the drawings, 1 represents a vehicle-axle of ordinary construction, and, as shown in Fig. 1 of the drawings, a wheel 2 is mounted upon one end of the same for the purpose of showing the application of my invention to said axle and wheel.

3 represents the fender, which is adjustable and is attached to the axle of the vehicle in a manner as hereinafter fully described.

4 represents the guard-plate of the fender, which is of suitable longitudinal dimensions and to be made, preferably, from a thin sheet of metal suitably shaped, as I shall now proceed to describe. The said plate when suitably shaped, as shown in Fig. 2, is approximately L-shaped in cross-section, the top of which is somewhat rounded, as shown at 5, and the depending edge 6 of said guard flat, which portion of said fender is adjacent to the inner edge of the wheel, preventing the dirt from passing into the vehicle. The curve of the said plate corresponds in curvature to the circumference of the wheel of the vehicle, or nearly so, and is adjusted to and from the said wheel, which is very desirable to accomplish the purpose.

7 represents a clip, which is especially constructed to adapt itself to my invention, the forked end of which spans the axle of the vehicle adjacent to the hub of the wheel, and the ends of the said clip are provided with screw-threads 8.

9 represents a plate, which is provided with two openings of suitable dimensions for receiving the ends of a clip 7, and when the said plate is placed in a position as shown in Fig. 2 nuts 10 are screwed upon the screw-threaded ends 8 of the clip, thereby holding the said clip firmly to the axle of the vehicle. The said clip 7 is provided with bifurcated extensions 11, and said extensions provided with transverse openings 12, through which bolts are adapted to be passed for holding and adjusting the fender, as hereinafter more fully described.

13 represents a plate, the width of which is preferably of a width corresponding to that of the extensions 11 and is adapted to be adjusted within said bifurcated extensions 11 of the clip 7. The said plate 13 is provided with an enlarged portion 14, which is adapted to come in contact with the upper ends of the extensions 11 when the guard is moved in its lowest position, and, further, provides means for strengthening the weakest portion of the device.

Formed integrally with the enlargement 14 or secured to the same in any mechanical manner are two supporting branch plates 15, which extend from said enlargement in a V-shaped manner and are provided with suitable bends 16 for causing the guard-plate 4 to come in proper alignment with the circumference of the wheel. The ends 17 of the plates 15 are secured to the plate 4 by means of rivets 18 or in any other mechanical manner.

The plate 13 is provided with two elongated slots 19, through which the bolts 20 are adapted to be passed, allowing a sufficient movement of the said plate when the parts are attached, as shown in Fig. 3. The bolts 20 are passed through the openings 12, formed in the bifurcated extensions 11, and also through the slots 19, formed in the plate 13, forming a movable connection between said plate and extensions, the adjustment being had by the nuts 21.

In carrying out my invention it may be necessary to provide additional means for rigidly holding the plate 13 in its proper adjustment to the extensions 11, owing to the jar imparted to the fender by the axle of the vehicle.

In order to prevent any possibility of the plate 13 from slipping, I provide the inner surfaces of the bifurcated ends of extensions 11 with serrations 22, which are adapted to come in contact with the flat surfaces of the said plate 13, and when the nuts 21 are screwed upon the bolts 20 in the proper direction the said bifurcated ends will be pressed firmly upon the plate 13.

From the foregoing description it will be seen that the fender can be adjusted in a horizontal direction upon the axle of the vehicle, and, further, can be adjusted to and from the circumference of the said wheel, thereby making said fender applicable to all sizes of vehicles.

I am aware that it is not broadly new to provide vehicle-fenders with a shank adjustable in a standard, and to such construction I lay no claim, my invention consisting in the specific construction, combination, and arrangement of parts as set forth in the following claims.

Having fully described my invention, what I claim is—

1. As an improvement in adjustable fenders of the class described, the combination, with a standard provided in its upper portion with a slot extending from side to side thereof and forming two parallel extensions 11, formed with bolt-apertures 12 near their upper and lower ends, of a flat plate 13, fitting within said slot and provided with two longitudinal slots 19, registering with the apertures 12, said plate carrying the fender, and bolts 20, passing through said apertures and slots 19 and provided upon one end with thumb-nuts 21, substantially as and for the purpose set forth.

2. A fender of the class described, consisting of a standard adapted to be attached to the vehicle-axle and provided at its upper end with two parallel extensions, a plate fitting between said extensions and provided with longitudinal slots registering with bolt-apertures in the extensions, a fender provided with a flange forming a guard-plate and connected with the adjustable plate, and bolts passing through said apertures and slots and provided at one end with thumb-nuts, all arranged and adapted to operate substantially as and for the purpose set forth.

In testimony whereof I affix my signature in presence of two witnesses.

CLAUS FREESE.

Witnesses:
C. F. KEELER,
L. L. TRACEY.